Aug. 13, 1935.　　　　　F. J. MACK　　　　　2,011,005
BERMUDA GRASS ATTACHMENT FOR LAWN MOWERS
Filed Dec. 19, 1933

Inventor
F. J. Mack
By Hazard and Miller
Attorneys.

Patented Aug. 13, 1935

2,011,005

UNITED STATES PATENT OFFICE 2,011,005

BERMUDA GRASS ATTACHMENT FOR LAWN MOWERS

Fred J. Mack, Santa Barbara, Calif.

Application December 19, 1933, Serial No. 703,090

6 Claims. (Cl. 56—294)

This invention relates to an attachment for lawn mowers which concerns a device which may be applied to the conventional lawn mower which will serve to enable the runners of Bermuda grass or what is sometimes called "devil's grass" to be lifted and cut by the lawn mower.

In certain parts of the United States, especially Southern California, lawns become contaminated with Bermuda grass or devil's grass. This Bermuda grass or devil's grass grows with long runners which lie close to the surface of the ground. It is objectionable in that it does not have the same color as the lawn, particularly in certain seasons of the year. Furthermore, it seems to have the ability to kill the lawn grass and clover. The customary practice to remove this Bermuda grass or devil's grass has been to rake it out of the lawn by means of a rake or a special Bermuda grass rake. Unless such measures are taken, during the normal cutting of the lawn the lawn mower merely passes over these low-lying runners without disturbing them.

It is an object of this invention to provide an attachment which will pass beneath these low-lying runners and lift them to the stationary, horizontal blade of the lawn mower so they can be sheared off by the movable blades of the lawn mower. In this way, by cutting the runners as frequently as the lawn is mowed, the Bermuda grass does not have an opportunity to spread and in the course of time, from the continuous cutting, it dies out.

With the foregoing and other objects in view, which will be made manifest in the following detailed description, and specifically pointed out in the appended claims, reference is had to the accompanying drawing for an illustrative embodiment of this invention, wherein:

Figure 1:
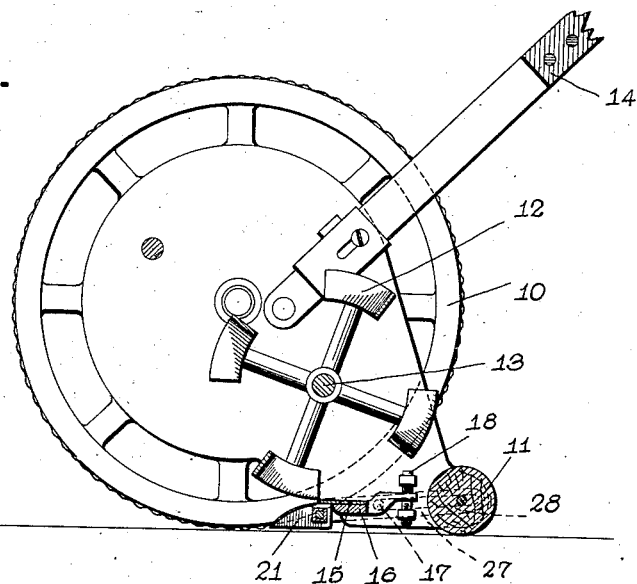
Fig. 1 is a sectional view through a conventional lawn mower, illustrating the attachment as having been applied thereto.
Figure 2:
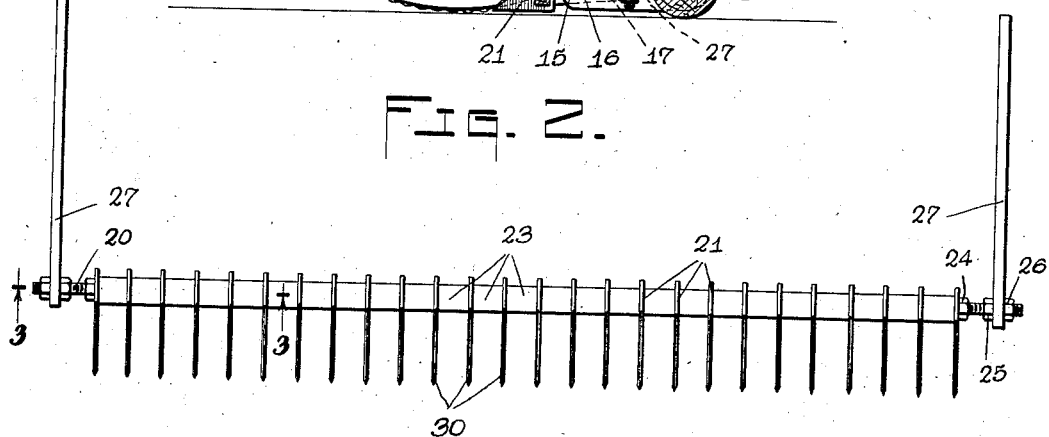
Fig. 2 is a top plan view of the attachment.
Figure 3:
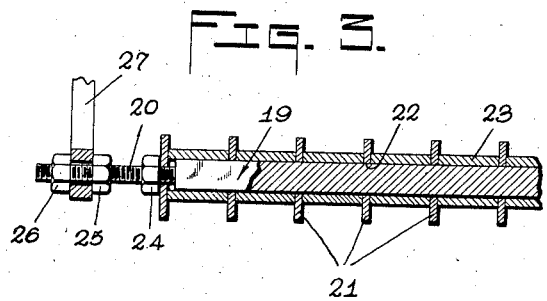
Fig. 3 is a partial view in section taken substantially upon the line 3—3 in the direction indicated.
Figure 4:
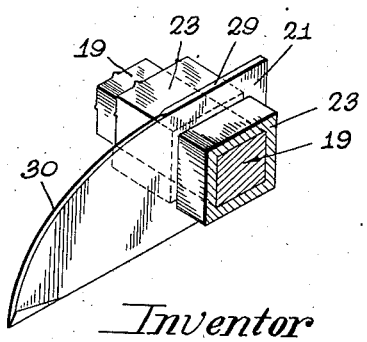
Fig. 4 is a partial view in perspective and section, illustrating the details of the construction of the attachment.

Referring to the accompanying drawing, wherein similar reference characters designate similar parts throughout, the lawn mower to which the attachment is illustrated as having been applied is of the conventional construction having ground wheels 10, a roller 11, movable blades 12, which are driven by the ground wheels 10 through a horizontal shaft 13. The handle of the lawn mower is indicated at 14. In the conventional construction there is a stationary, horizontal blade or grass part 15 which is mounted on a transversely extending bar 16, which has outwardly extending pivots 17 extending outwardly through the frame of the lawn mower. Adjustment of this bar so as to adjust the forward edge of blade 15 with respect to the movable blades 12 is accomplished by means of an adjusting screw 18 which is rotatably mounted on extensive lugs on the inner side of the frame. The adjusting screw is threaded into a rearwardly extending projection on bar 16, so that by rotation of the screw adjustment of bar 16, which pivots on 17 as the center, is possible. The roller 11 has pintles at its ends which extend outwardly through the frame. The above described construction is conventional and it will be appreciated that the attachment constituting the present invention may be applied to any conventional type of lawn mower.

The attachment consists of a transversely extending rod or bar 19 which is non-circular in cross section throughout the major portion of its length. Preferably, it is rectangular in section. The ends of the rod or bar 19 are reduced and made circular in section, as indicated at 20, and are threaded. A plurality of upright blades 21 have rectangular apertures 22 formed therein corresponding to the shape of the non-circular portion of rod or bar 19. These blades are parallel to each other and are spaced apart. The spacing may vary but the distance between adjacent blades is preferably in the neighborhood of one-half inch. Tubular spacers 23, which are made rectangular in section, are slipped on to the rod or bar 19 and space the blades properly from each other. As the blades fit the non-circular rod they are incapable of turning relatively thereto. Jamb nuts 24 are screwed on to the threaded portions 20 at the ends of the rod and are tightened against the end blades so that all of the blades and intervening spacers are held tightly together. Outwardly of nuts 24 there are also screwed on to threaded portions 20 two opposed nuts 25 and 26, there being two of these nuts at each end of the rod. Between these nuts on each end of the rod there are disposed links or brackets 27 which are slotted as indicated at 28 throughout the major portions of their lengths. The slots 28 are designed to receive the projecting ends of pivots 17 and the projecting ends of pintles on roller 11. Nuts are placed on these projecting ends of the pivots and pintles and tighten the links or brackets 27 against the outer sides of the frame of the lawn mower. With the links or brackets 27 thus fastened to the outer sides of the lawn mower frame, the top edges 29 are positioned against the bottom of blade 15 and against the forward side of bar 16. On tightening nuts 25 and 26 against their respective links or brackets 27, rod or bar 19 is held in adjusted position. The upright blades 21 present top edges which are horizontal at their rear ends, as indicated at 29. At their forward ends these top edges, indicated at 30, curve downwardly and forwardly to the bottom edges of the blades.

By this construction it will be appreciated that during the normal operation of the lawn mower points of the blades pass along very close to the surface of the ground. They pass beneath the runners of the Bermuda grass and lift these runners up on to the stationary blade 15 so that the rotating or movable blades 12 may shear off these runners, whereas heretofore in the use of the conventional lawn mower blade 15 would merely pass over these runners without disturbing them and leave them uncut. The attachment forces these runners to be lifted so as to be cut. As the blades 21 are narrow, they pass between the blades of blue grass, which normally stand upright or nearly so, without injuring this grass in any way. The Bermuda grass, however, is effectively cut and kept from spreading and in the course of time the Bermuda grass, by having its runners continually cut, seems to die out.

Under different circumstances it may be necessary to adjust the positions of the points of the blades to cause them to pass closer to the ground than shown or at a greater distance therefrom. Such adjustment is accomplished by loosening nuts 25 and 26 and rotating rod or bar 19 into the desired position and thereafter tightening the nut.

In the event that any of the blades 21 should become broken this blade can be easily replaced by detaching rod or bar 19 from links 27, removing nut 24, and slipping off the broken blade and replacing it with a new one.

In referring to parts 21 as blades, the edges 30 may be sharp so as to cut the runners of the Bermuda grass themselves, but they are not necessarily sharp, for one of their principal functions is to elevate the runners on to stationary blade 15 so as to be cut by the movable blades.

From the above described construction it will be appreciated that the attachment is relatively simple, durable, and may be easily manufactured and applied and that it will effectively serve the purpose for which it has been designed.

Various changes may be made in the details of construction by those skilled in the art without departing from the spirit or scope of the invention as claimed.

I claim:

1. In combination with a lawn mower having a stationary horizontal blade adapted to be traversed by movable shearing blades, a transversely extending, non-circular bar beneath the horizontal blade, a plurality of longitudinally extending upright blades having corresponding non-circular apertures therein through which the bar extends, spacers on the bar between the blades, and means for mounting the bar at its ends upon the body of the lawn mower, said means enabling rotational adjustment of the bar and the blades carried thereby.

2. In a lawn mower having a stationary cutting blade and rotatable cutters to engage therewith, the combination of a transverse bar adjustably secured to the frame of the mower for longitudinal movement below the stationary blade transverse to the cutting edge of the blade and a plurality of longitudinally extending upright blades secured to the bar with sharpened forward and upper edges.

3. In a lawn mower having a frame with a pivotally mounted cutting blade, the combination of a pair of brackets secured to the said frame and having a transverse bar located below the forward edge of the said blade, the said bar having a plurality of longitudinally extending upright blades secured thereto, these having a forward and upper curved edge to deflect grass to the pivoted blade.

4. In a lawn mower having a frame with a transverse cutting blade having pivots on its opposite ends, a roller having axle ends journaled in the frame combined with a pair of brackets mounted on the pivots for the blade and the axles of the roller, a transverse bar secured to said brackets below the cutting blade, a plurality of longitudinally extending vertical blades secured in spaced relation on the bar, said blades having curved forward and upper edges to deflect grass to the transverse blade.

5. In a lawn mower having a frame, a transverse bar having pivots at its end mounted in the frame, a cutting blade secured to said bar combined with a pair of brackets having slots therein, the said pivots extending through the slots, means to tighten the brackets to the pivots, a cross bar secured to the ends of the brackets and having a plurality of longitudinally extending parallel vertical blades secured thereto, said blades having a substantially horizontal lower surface and a curved front and top surface, the rear portion of the top surface being located below the cutting blade.

6. In a lawn mower having a frame as claimed in claim 5, the lawn mower having a roller with axle ends, the said axle ends extending through the slots in the brackets adjacent the rear end of said brackets.

FRED J. MACK.